United States Patent
Liu et al.

(10) Patent No.: US 9,152,544 B2
(45) Date of Patent: Oct. 6, 2015

(54) METHOD AND SYSTEM FOR UPGRADING A FIRMWARE OF A CHIP AND BASEBOARD MANAGEMENT CONTROLLER BY WAITING UNTIL AN IDLE STATE OF A CONNECTED SYSTEM TO FINISH UPGRADE

(71) Applicant: Huawei Technologies Co., Ltd., Shenzhen, Guangdong (CN)

(72) Inventors: Hongguang Liu, Hangzhou (CN); Yu Zhang, Shenzhen (CN); Lixia Xu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 397 days.

(21) Appl. No.: 13/689,246

(22) Filed: Nov. 29, 2012

(65) Prior Publication Data
US 2013/0132700 A1 May 23, 2013

Related U.S. Application Data (63) Continuation of application No. PCT/CN2011/077447, filed on Jul. 21, 2011.

(51) Int. Cl.
G06F 12/00 (2006.01)
G06F 9/445 (2006.01)

(52) U.S. Cl.
CPC ............... *G06F 12/00* (2013.01); *G06F 8/665* (2013.01)

(58) Field of Classification Search
CPC ....... G06F 8/65; G06F 8/665; G06F 11/1433; G06F 12/00
USPC .................................. 711/170; 713/1
See application file for complete search history.

(56) References Cited

U.S. PATENT DOCUMENTS

| 7,073,064 B1 * | 7/2006 | Angelo et al. ................. 713/176 |
| 7,375,549 B1 * | 5/2008 | Tang et al. ....................... 326/38 |

(Continued)

FOREIGN PATENT DOCUMENTS

| CN | 101179624 A | 5/2008 |
| CN | 101826025 A | 9/2010 |

(Continued)

OTHER PUBLICATIONS

International Search Report in corresponding International Patent Application No. PCT/CN2011/077447 (May 3, 2012).

(Continued)

*Primary Examiner* — Thomas Lee
*Assistant Examiner* — Danny Chan
(74) *Attorney, Agent, or Firm* — Leydig, Voit & Mayer, Ltd.

(57) ABSTRACT

The present invention relates to the field of communications, and in particular, to a method and a system for dynamically upgrading a chip and a baseboard management controller. The method includes: obtaining an upgrade file that is used for upgrading a chip; upgrading, based on the upgrade file, data in a flash memory that is used for storing data of the chip, and not performing a reset operation on the chip at this time; and when it is acquired through detection that the state of a service system that is connected to the chip is a service idle state, replicating the upgraded data in the flash memory to a random access memory in the chip, and performing a reset operation on the chip. According to the present invention, the availability and maintainability of the system are improved.

12 Claims, 4 Drawing Sheets

(56) References Cited

U.S. PATENT DOCUMENTS

2008/0093455 A1* 4/2008 Barten .......................... 235/454
2011/0197185 A1* 8/2011 Hobbet et al. ................ 717/168

FOREIGN PATENT DOCUMENTS

| CN | 101853171 A | 10/2010 |
| CN | 101853172 A | 10/2010 |
| CN | 101894029 A | 11/2010 |
| CN | 101901156 A | 12/2010 |

OTHER PUBLICATIONS

1st Office Action in corresponding Chinese Patent Application No. 201180001508.8 (Mar. 5, 2013).

* cited by examiner

METHOD AND SYSTEM FOR UPGRADING A FIRMWARE OF A CHIP AND BASEBOARD MANAGEMENT CONTROLLER BY WAITING UNTIL AN IDLE STATE OF A CONNECTED SYSTEM TO FINISH UPGRADE

CROSS-REFERENCE TO RELATED APPLICATIONS

This application is a continuation of International Patent Application No. PCT/CN2011/077447, filed on Jul. 21, 2011, which is hereby incorporated by reference in its entirety.

FIELD OF THE INVENTION

The present invention relates to the field of communications, and in particular, to a method for dynamically upgrading a chip, a chip upgrade system and a baseboard management controller.

BACKGROUND OF THE INVENTION

A complex programmable logic device (CPLD) of a fault-tolerant computer system is located between a service system and a baseboard management controller (BMC) system, and is mainly used for extending peripheral functions of a master chip of the BMC system, thereby acting as a bridge between the BMC system and the service system. The CPLD in the system is responsible for critical tasks such as power-up and power-down time sequence control of the service system, acquisition of various state parameters of the CPU, and peripheral bus simulation.

Figure 1:
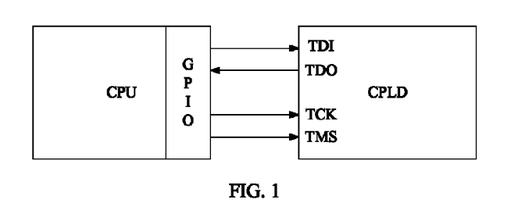
FIG. 1 is a schematic diagram of hardware connection for performing online upgrade of a CPLD through an ordinary In System Program ISP in the prior art.

Due to reasons such as the improvement of functions and system maintenance, a demand for upgrading logics inside the CPLD exists. FIG. 1 shows an existing solution for performing online upgrade on the CPLD through an ordinary In System Program (ISP). As shown in FIG. 1, in this solution, at a hardware level, four general purpose input/output (GPIO) interfaces of an embedded CPU are respectively connected to TDI, TDO, TCK and TMS signal pins of a joint test action group (JTAG) module on the CPLD; while at a software level, an ISP service software is run on the embedded CPU, for parsing an upgrade file. On the foregoing software and hardware basis, the online upgrade of logics inside the CPLD is implemented through a single upgrade file.

Online load of upgrade software can be achieved by adopting this solution; however, in a procedure of performing an upgrade operation on the CPLD, the upgrade operation cannot be interrupted, and once the upgrade operation is started, the existing logics of the CPLD become invalid. Therefore, the service system is inevitably forced to power down first, and then the upgrade operation is completed till the upgrade ends. In this way, the system downtime is increased, and the system availability is lowered.

SUMMARY OF THE INVENTION

Embodiments of the present invention provide a method for dynamically upgrading a chip, a baseboard management controller and a chip upgrade system, so as to improve availability and maintainability of the system.

An embodiment of the present invention provides a method for dynamically upgrading a chip, which includes:
obtaining an upgrade file that is used for upgrading a chip;
upgrading, based on the upgrade file, data in a flash memory that is used for storing data of the chip, and not performing a reset operation on the chip at this time; and
when it is acquired, through detection, that a state of a service system that is connected to the chip is a service idle state, replicating the upgraded data in the flash memory to a random access memory in the chip, and performing a reset operation on the chip.

In addition, an embodiment of the present invention provides a baseboard management controller for executing the method for dynamically upgrading a chip of the present invention, and the baseboard management controller includes:
an obtaining module, configured to obtain an upgrade file for upgrading a chip that is managed by the baseboard management controller;
a flash memory update module, configured to upgrade, based on the upgrade file obtained by the obtaining module, data in a flash memory that is used for storing data of the chip, and prohibit performing a reset operation on the chip;
a state detecting module, configured to detect whether a state of a service system that is connected to the chip is a service idle state, and generate a detection result; and
a memory update module, configured to, when the state detecting module acquires, through detection, that the state of the service system that is connected to the chip is the service idle state, replicate the upgraded data in the flash memory to a random access memory in the chip, and perform a reset operation on the chip.

In addition, an embodiment of the present invention further provides a chip upgrade system, and the system includes:
a chip, where the chip includes a built-in or external flash memory that is used for storing data of the chip, a random access memory that is built in the chip and used for storing the data of the chip, and a peripheral input/output interface that is used for communicating with an external connection equipment of the chip; and
a baseboard management controller, configured to perform upgrade management on the chip, where the baseboard management controller is a baseboard management controller provided in the present invention.

The chip in the embodiment of the present invention is any one of a complex programmable logic device CPLD, a field-programmable gate array FPGA and a basic input output system BIOS.

In the above technical solutions, the chip upgrade is not completed at a time, and the upgrade is divided into multiple separate stages. The embodiments of the present invention include a stage of upgrading the flash memory of the chip. In this stage, due to non-volatility of the flash memory, even if the service system powers down in a subsequent upgrade procedure, performance of the system may not be affected, and no reset operation is performed on the chip in this stage; and therefore, if a subsequent upgrade has not been performed on the chip, it is ensured that original data in the chip can be run normally. In addition, in the embodiments of the present invention, when the state of the service system automatically changes into the service idle state, the upgraded data in the flash memory is replicated to the random access memory in the chip, so as to complete a full upgrade of the chip. The advantages of this manner is that, mandatorily requiring the service system to shut down and power down during the whole upgrade procedure is changed into passively waiting for the service system to actively stop a service, so that the system downtime is greatly reduced, and the reliability and maintainability of the system are improved. In addition, according to the present invention, before the upgraded data in the flash memory is replicated to the random access memory in the chip, a current state of the input/output interface of the chip is locked, so that in the subsequent procedure of upgrading the chip, a fault operation of the service system may not be caused due to uncontrollability of the input/output interface.

DETAILED DESCRIPTION OF THE EMBODIMENTS

Currently, a procedure of upgrading a chip (for example, CPLD) that is managed by a baseboard management controller is performed through CPU and ISP service software, and online upgrade of logics inside the chip is implemented through a single upgrade file. In this upgrade manner, once an upgrade operation is started, the existing logics of the chip become invalid, and therefore, the service system connected to the chip is inevitably forced to power down, and the upgrade operation is completed till the upgrade ends. In this way, the system downtime is increased, and the system availability is lowered. The present invention provides a method for dynamically upgrading a chip, a baseboard management controller and a chip upgrade system. The upgrade is divided into multiple separate stages. The present invention includes a stage of upgrading the flash memory of the chip. In this stage, due to non-volatility of the flash memory, even if the service system powers down in a subsequent upgrade procedure, performance of the system may not be affected, and no reset operation is performed on the chip in this stage; and therefore, if a subsequent upgrade has not been performed on the chip, it is ensured that original data in the chip can be run normally. In addition, in the present invention, when a state of the service system automatically changes into a service idle state, the upgraded data in the flash memory is replicated to the random access memory in the chip, so as to complete the upgrade of the chip. The advantages of this manner is that, mandatorily requiring the service system to shut down and power down during the whole upgrade procedure is changed into passively waiting for the service system to actively stop a service, so that the system downtime is reduced and the reliability and maintainability of the system are improved. In addition, according to the present invention, before the upgraded data in the flash memory is replicated to the random access memory in the chip, a current state of the peripheral input/output interface of the chip is locked, so that in the subsequent procedure of upgrading the chip, a fault operation of the service system may not be caused due to uncontrollability of the peripheral input/output interface.

In the technical solutions of the present invention, an upgrade of a chip where a complex programmable logic device (CPLD), a field-programmable gate array (FPGA) or a basic input output system (Basic Input Output System, BIOS) is located may be completed through a baseboard management controller (BMC). The chip (a CPLD chip, an FPGA chip or a chip where the basic input output system (BIOS) is located) in the embodiments of the present invention includes a built-in or external flash memory that is used for storing data of the chip, a random access memory that is built in the chip and used for storing the data of the chip, and an input/output interface that is used for communicating with an external connection equipment of the chip.

The upgrade of the CPLD by the BMC is taken as an example below, to illustrate the content of the technical solutions that are provided in the embodiments of the present invention in detail with reference to FIG. 2 to FIG. 6.

Figure 2:
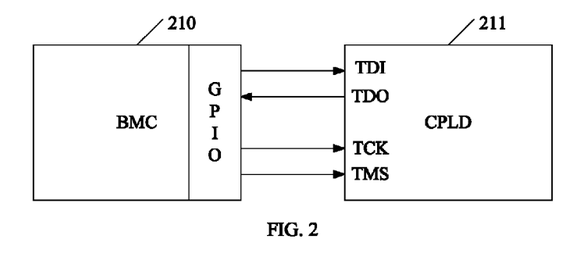
FIG. 2 is a schematic diagram of hardware connection for an embodiment of a CPLD chip upgrade system according to the present invention.

FIG. 2 is a schematic diagram of hardware connection for an embodiment of a CPLD chip upgrade system according to the present invention. As shown in FIG. 2, the CPLD chip upgrade system of the present invention includes a BMC 210 and a CPLD 211, which adopt a universal ISP hardware connection manner. Four general purpose input/output (GPIO) interfaces of the BMC 210 are respectively connected to TDI, TDO, TCK and TMS signal pins of a Joint Test Action Group (JTAG) module on the CPLD 211, so as to establish data connection with the CPLD through input and output of the four GPIOs of the BMC.

Figure 3:
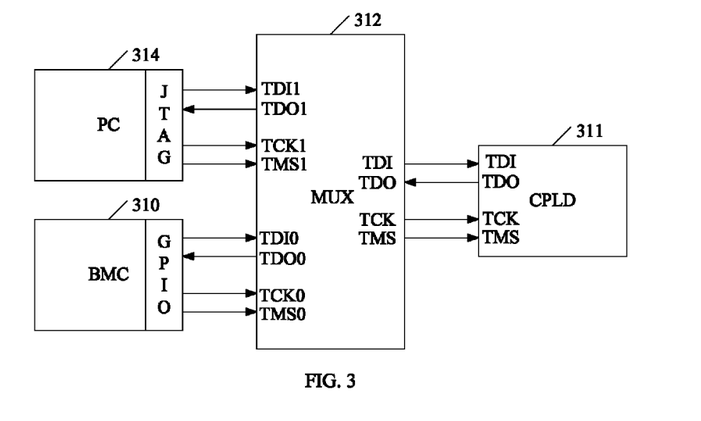
FIG. 3 is a schematic diagram of hardware connection for another embodiment of the CPLD chip upgrade system according to the present invention.

However, in specific implementation, the CPLD of the present invention may be a CPLD in a Sandy Bridge 4P system. At this time, in consideration of an application scenario of a stage for developing and debugging logics inside the CPLD, an interface for establishing connection between the CPLD and a development tool of a computer (PC) is reserved, and meanwhile it needs to meet that the GPIO port of the BMC can be connected to an interface in the JTAG module of the CPLD. Therefore, in specific implementation, the CPLD chip upgrade system of the present invention may also be shown in FIG. 3, which is a schematic diagram of hardware connection for another embodiment. Specifically, as shown in FIG. 3, in this embodiment, the BMC 310 is indirectly connected to the CPLD 311 through a multiplexer (MUX) 312. Signals transmitted from the BMC 310 and the PC 314 reach the CPLD 311 through alternative selection of the MUX; the interface of the JTAG module of the PC 314 may be connected to TDI1, TDO1, TCK1 and TMST signal pins on the MUX 312; and the GPIO port of the BMC 310 can be connected to TDI0, TDO0, TCK0 and TMS0 signal pins on the MUX 312. In specific implementation, when the JTAG of the PC 314 is connected to the MUX, the MUX 312 connects the CPLD 311 to the PC 314; and otherwise, the MUX 312 connects the CPLD 311 to the BMC 310. Generally, when the system of the CPLD 311 does not need to be developed and debugged, the CPLD 311 may certainly not be connected to the PC 314, and at this time, the BMC 310 and the CPLD 311 may stay connected, which provides a hardware condition for dynamic upgrade of the CPLD.

Figure 4:
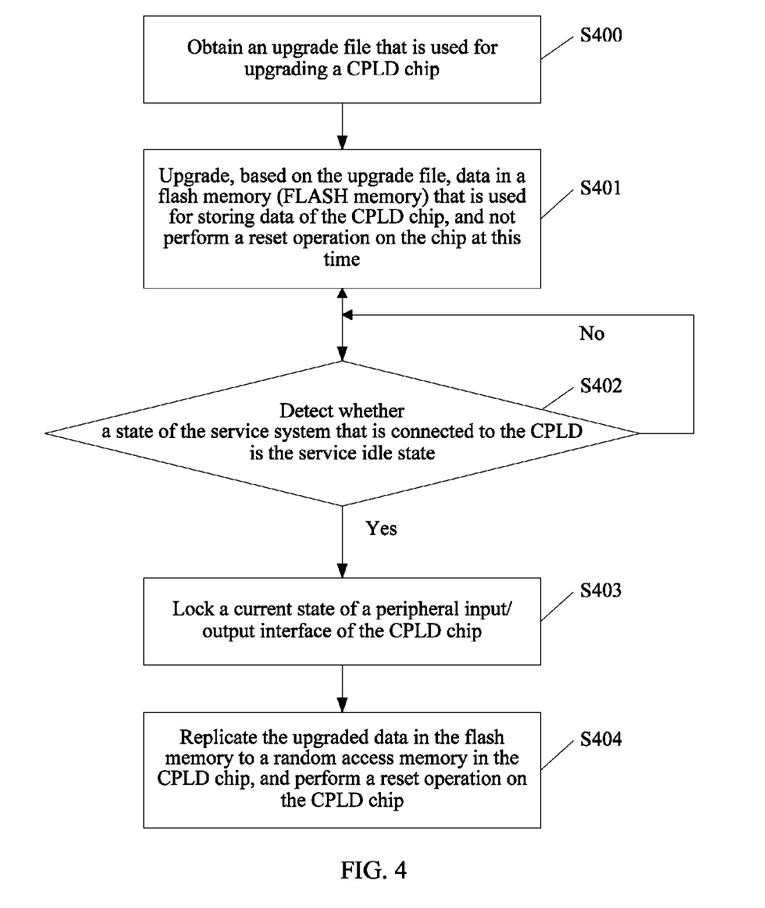
FIG. 4 is a schematic flow chart of an embodiment of a method for dynamically upgrading a CPLD chip according to the present invention.

FIG. 4 is a schematic flow chart of an embodiment of a method for dynamically upgrading a CPLD chip according to the present invention. As shown in FIG. 4, the method of this embodiment includes:

Step S400: Obtain an upgrade file that is used for upgrading a CPLD chip. In specific implementation, in step S400, a compressed packet of the upgrade file (for example, a VME upgrade file in the present invention) may be transmitted to a specific route in the BMC in a manner of network transmission (for example, the compressed packet of the upgrade file may be obtained from onboard administration (OA)) or in a manner of local copy, and the BMC performs a decompressing operation and saves the decompressed upgrade file. In addition, to ensure the reliability of the upgrade file, optionally, in step S400, when the upgrade file that is used for upgrading the CPLD chip is obtained, cyclic redundancy check (CRC check) is performed on the obtained upgrade file, to obtain a check result; when the obtained check result is that the upgrade software is not damaged, it indicates that a subsequent upgrade operation may be performed; and when the obtained check result is that the upgrade software is damaged, upper software is notified that the upgrade fails. The validity of the upgrade file is ensured through CRC check.

Figure 5:
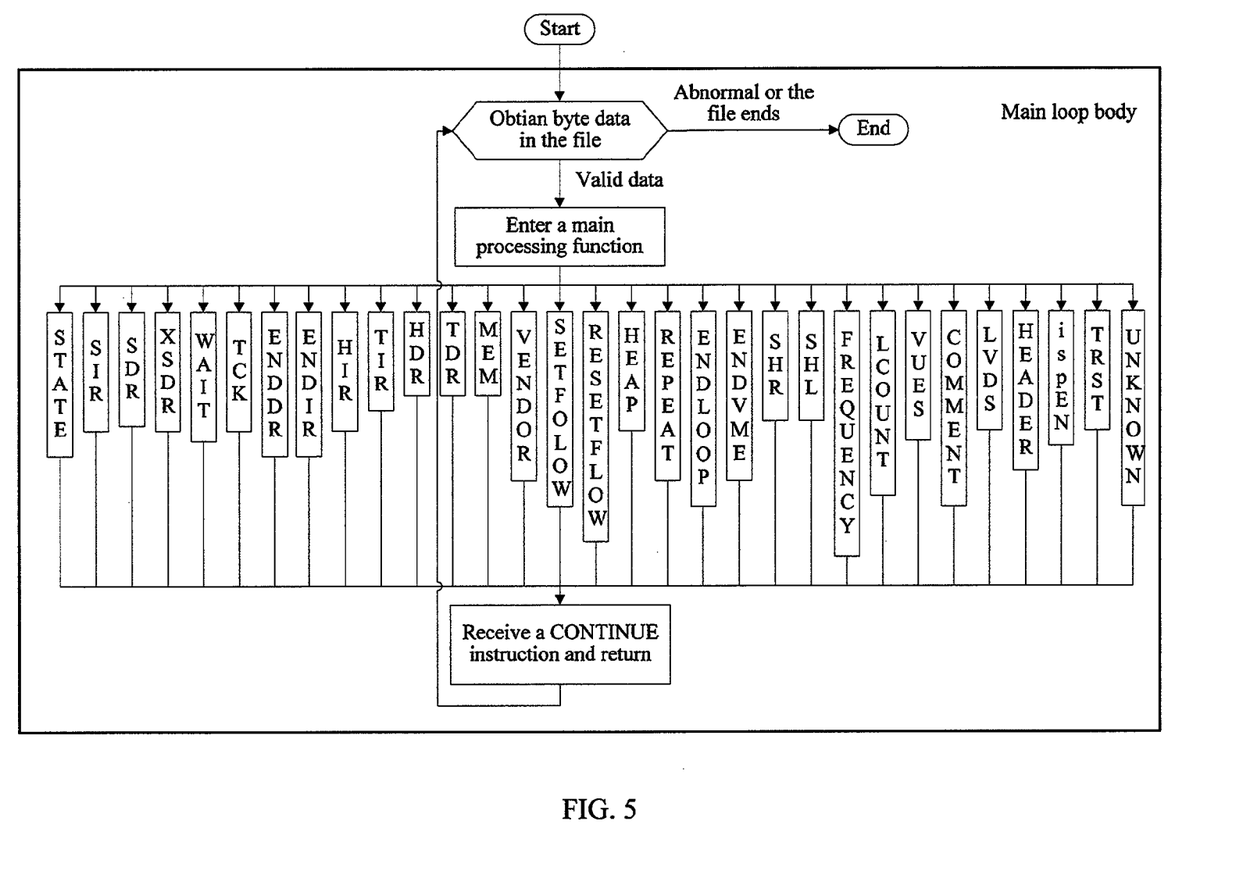
FIG. 5 is an architectural diagram of a backbone and a branch processing flow for upgrading FLASH data according to the present invention.

Step S401: Upgrade, based on the upgrade file, data in a flash memory (FLASH memory) that is used for storing data of the CPLD chip, and not perform a reset operation on the chip at this time. In specific implementation, the FLASH and an SRAM are built in the CPLD chip (the FPGA chip and the chip where the BIOS is located have no built-in FLASH, so when the FPGA chip and the chip where the BIOS is located are upgraded in the present invention, a FLASH needs to be externally disposed for them; one FLASH needs to be externally disposed for the FPGA, and then the FLASH cooperates with a RAM in the FPGA to complete data upgrade; and the chip where the BIOS is located needs to be provided with two external FLASHs, and the two FLASHs together implement data upgrade). The FLASH is used for saving logic data run by the CPLD, and the logic data may not get lost when power is off. The SRAM is also used for storing the logic data, but the logic data in the SRAM automatically gets lost when power is off. Therefore, in step S401 of the present invention, data upgrade is first performed on the FLASH in the CPLD chip. Specifically, in step S401, the BMC in the present invention may complete upgrade of data in the FLASH by running the VME upgrade file. The BMC first obtains an original complete VME file, then removes a related operation instruction that is used for resetting the CPLD in the file, and then adopts online upgrade software to run the VME upgrade file to complete load of the FLASH data. However, the online upgrade software is adopted to run the VME upgrade file, which is implemented in the following manner: executing a main loop body of the VME upgrade file, and obtaining content of the VME upgrade file sequentially by byte; for byte data which is valid after a check, entering a corresponding branch processing flow, and reading, by the branch processing flow, the byte data in a manner supported by the branch processing flow; and after the branch processing flow is completed, returning to the main loop body to continue obtaining byte data, and again sending the byte data to a branch processing flow that corresponds to the newly obtained byte data, till the VME upgrade file is obtained sequentially and completely, and read by each branch processing flow completely. FIG. 5 shows an architectural diagram of a backbone and a branch processing flow for upgrading the FLASH data, and STATE and SIR in FIG. 5 are both branch processing functions used in the branch processing flow. In this embodiment, the FLASH is characterized in that the data may not be lost when power is off, so that after the CPLD is powered off abnormally and then powered up again, the latest logic data can be obtained from the FLASH and run, and the system ensures automatic validation of the latest logic data after power-up. Moreover, no reset operation is performed on the CPLD chip in this stage; and therefore, if a subsequent upgrade has not been performed on the CPLD chip, it is ensured that the original data in the CPLD chip can be run normally.

Step S402: Detect whether the state of the service system that is connected to the CPLD is the service idle state, to obtain a detection result. When the detection result is yes, perform step S403 or step S404 (when the embodiment does not include step S403, and the detection result is yes, directly perform step S404); and when the detection result is no, continue performing the detection in step S402. In specific implementation, in step S402, the detection of the state of the service system may be implemented in the following two different manners. One manner is: regularly querying a state parameter of the service system through an upgrade process, to acquire whether the state of the service system is the service idle state; and when the upgrade process queries that the state of the service system is the service idle state, determining that the state which is of the service system connected to the chip and acquired through detection is the service idle state. The other manner is: suspending an upgrade process, and monitoring in real time the state of the service system through a process that focuses on state monitoring of the service system to acquire whether the state of the service system is the service idle state; and when the process focusing on state monitoring of the service system monitors that the state of the service system is the service idle state, awakening the upgrade process, and determining that the state which is of the service system connected to the chip and acquired through detection is the service idle state. Either of the foregoing two manners can be adopted in step S402 to complete the detection.

Step S403: Lock the current state of a peripheral input/output interface of the CPLD chip. In specific implementation, optionally, the upgrade method of the present invention may include step S403. In step S403, the BMC sends a control instruction to the CPLD, so as to lock the current state of the input/output interface of the CPLD. The advantage of this manner is that, in the subsequent procedure of upgrading the CPLD chip, a fault operation of the service system may not be caused due to uncontrollability of the input/output interface of the CPLD. Specifically, the locking of the state of the input/output interface of the CPLD may be completed in the following manner: resetting a JTAG, to make the JTAG module in the CPLD enter an IDLE state, and prepare to accept a subsequent instruction; checking an IDCODE instruction, obtaining data from a TDO port, and examining whether a JTAG logic is normal; sending a sample instruction, that is, sending a sample instruction to the JTAG, obtaining a current state parameter of the peripheral input/output interface of the CPLD, and locking and saving the state parameter; and ending the locking operation.

Step S404: Replicate the upgraded data in the flash memory to a random access memory in the CPLD chip, and perform a reset operation on the CPLD chip. In specific implementation, in addition to the FLASH, the CPLD chip further includes a random access memory in the form of an SRAM or a DRAM. When it is determined in step S402 that the state of the service system is the idle state, in step S404, the BMC moves the upgraded data in the flash memory of the CPLD chip to the random access memory in the CPLD chip, thereby implementing that the upgraded data in the CPLD formally becomes valid. In step S404, the BMC may specifically execute the following flow: resetting the JTAG module, to make the JTAG module in the CPLD enter the IDLE state, and prepare to accept an instruction; sending an SRAM enable instruction, to enable the SRAME in the CPLD to enter an erasable and programmable state, and create a running condition for a subsequent instruction; delay waiting, to wait for completion of the previous instruction; sending an erasing instruction, to erase an existing internal configuration; delay waiting, to wait for completion of the previous instruction; sending an ENABLE instruction, to allow the CPLD erasing and programming; delay waiting, to wait for completion of the previous instruction; sending a DISENABLE instruction, to complete an operation of the previously sent instruction, and implementing a load action of a new logic from the FLASH to the SRAM; sending a BYPASS instruction, to make the JTAG module of the CPLD in a bypass state, and disconnect with one or more other modules, that is, the new logic of the CPLD works normally; and resetting the JTAG module, to make the JTAG enter an IDLE state.

It can be seen from step S402 to step S404 that, in the embodiment of the present invention, when the state of the service system automatically changes into the service idle state, the upgraded data in the flash memory is replicated to the random access memory in the chip, so as to complete a full upgrade of the chip. The advantages of this manner is that, mandatorily requiring the service system to shut down and power down during the whole upgrade procedure is changed into passively waiting for the service system to actively stop a service, so that the system downtime is greatly reduced and the reliability and maintainability of the system are improved.

To sum up, in the foregoing embodiment, the upgrade of the CPLD is divided into multiple separate stages, which first include a stage of upgrading the flash memory of the CPLD chip. In this stage, due to non-volatility of the flash memory, even if the service system powers down in the subsequent upgrade procedure, performance of the system may not be affected, and no reset operation is performed on the CPLD chip in this stage; and therefore, if a subsequent upgrade has not been performed on the CPLD chip, it is ensured that the original data in the CPLD chip can be run normally. In addition, in the embodiment of the present invention, when the state of the service system automatically changes into the service idle state, the upgraded data in the flash memory is replicated to the random access memory in the CPLD chip, so as to complete a full upgrade of the CPLD chip. The advantage of this manner is that, mandatorily requiring the service system to shut down and power down during the whole upgrade procedure is changed into passively waiting for the service system to actively stop a service, so that the system downtime is greatly reduced and the reliability and maintainability of the system are improved. In addition, according to the foregoing embodiment, optionally, before the upgraded data in the flash memory is replicated to the random access memory in the CPLD chip, the current state of the peripheral input/output interface of the CPLD chip is locked, so that in the subsequent procedure of upgrading the CPLD chip, a fault operation of the service system may not be caused due to uncontrollability of the peripheral input/output interface.

Figure 6:
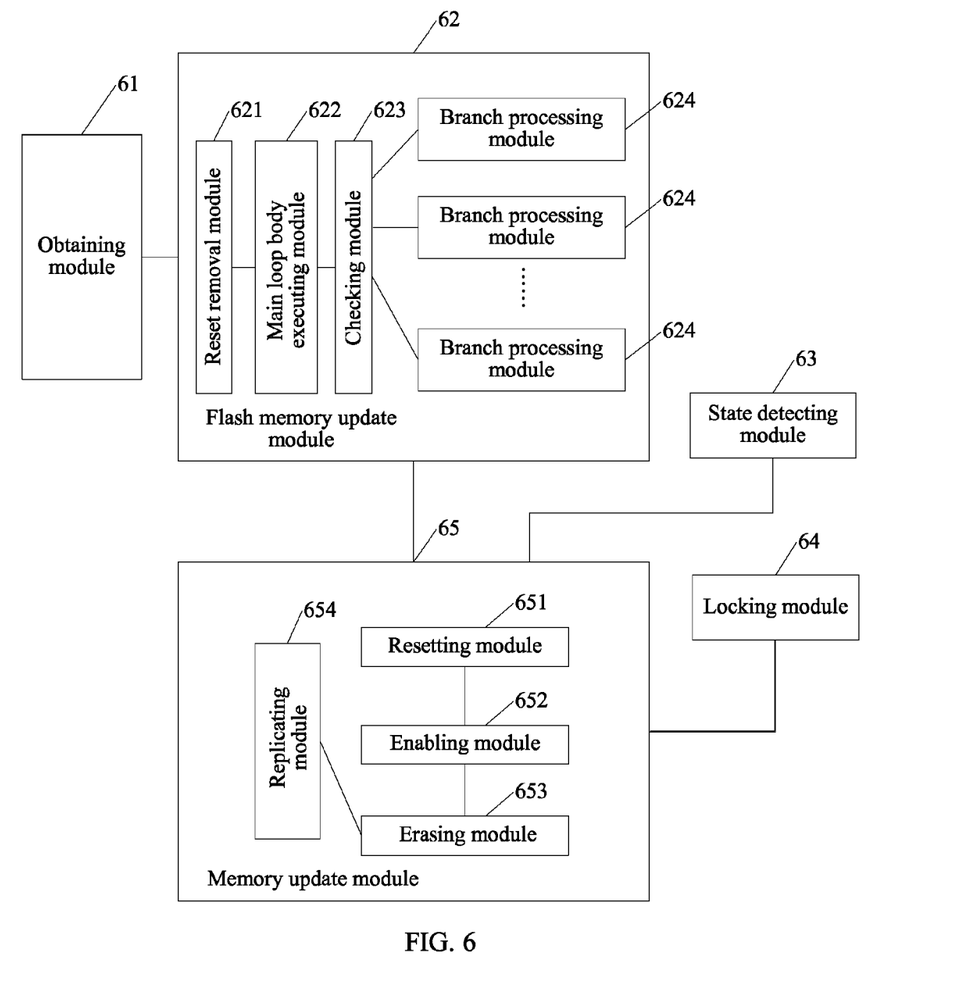
FIG. 6 is a schematic diagram of a structural framework of an embodiment of a baseboard management controller (BMC) according to the present invention.

Accordingly, FIG. 6 is a schematic diagram of a structural framework of an embodiment of a baseboard management controller (BMC) according to the present invention. The baseboard management controller may be configured to upgrade a chip where a complex programmable logic device (CPLD), a field-programmable gate array (FPGA) or a basic input output system (BIOS) is located, for example, upgrade the CPLD through the method shown in FIG. 4 of the present invention. Specifically, as shown in FIG. 6, the BMC of the present invention includes an obtaining module 61, a flash memory update module 62, a state detecting module 63, a locking module 64, and a memory update module 65.

The obtaining module 61 is configured to obtain an upgrade file that is used for upgrading a chip managed by the baseboard management controller. In specific implementation, a compressed packet of the upgrade file (for example, a VME upgrade file in the present invention) may be transmitted to the BMC in a manner of network transmission (for example, the compressed packet of the upgrade file may be obtained from onboard administration (OA)) or in a manner of local copy, and the BMC performs a decompressing operation and saves the decompressed upgrade file. In addition, to ensure the reliability of the upgrade file, optionally, the obtaining module 61 of the present invention is further configured to, when the upgrade file for upgrading the chip is obtained, perform cyclic redundancy check (CRC check) on the obtained upgrade file, to obtain a check result; when the obtained check result is that the upgrade software is not damaged, indicate that a subsequent upgrade operation may be performed; and when the obtained check result is that the upgrade software is damaged, notify upper software that the upgrade fails. The validity of the upgrade file is ensured through CRC check.

The flash memory update module 62 is configured to upgrade, based on the upgrade file obtained by the obtaining module 61, data in a flash memory that is used for storing data of the chip, and prohibit performing a reset operation on the chip. In specific implementation, the FLASH and an SRAM are built in the CPLD chip (the FPGA chip and the chip where the BIOS is located have no built-in FLASH, so that when the FPGA chip and the chip where the BIOS is located are upgraded in the present invention, an external FLASH needs to be provided for them; the FPGA needs to be provided with one external FLASH, and then the FLASH cooperates with a RAM in the FPGA to complete data upgrade; and the chip where the BIOS is located needs to be provided with two external FLASHs, and the two FLASHs together implement data upgrade). The FLASH is used for saving logic data run by the chip, and the logic data may not get lost when power is off. The SRAM is also used for storing the logic data, but the logic data in the SRAM automatically gets lost when power is off. Therefore, in the present invention, data for upgrading the chip is first updated to the FLASH through the flash memory update module 62. Specifically, the flash memory update module 62 in the present invention may complete upgrade of data in the FLASH by running the VME upgrade file. Further, as shown in FIG. 6, the flash memory update module 62 in the present invention may further include a reset removal module 621, a main loop body executing module 622, a checking module 623, and multiple branch processing modules 624. The reset removal module 621 is configured to obtain a complete VME upgrade file, and remove an operation instruction that is used for resetting the chip in the file. The main loop body executing module 622 is configured to execute a main loop body of the VME upgrade file, and obtain content of the VME upgrade file sequentially by byte, till the VME upgrade file is sequentially and completely obtained by the main loop body executing module. The checking module 623 is configured to check the validity of the content of the VME upgrade file that is obtained by the main loop body executing module 622, and obtain a check result. The multiple branch processing modules 624 are configured to read, in a manner supported by the branch processing modules 624, byte data which is sent to the branch processing modules 624 and is valid after a check that is performed by the checking module 623, and notify the main loop body executing module 622 after the reading operation is completed. FIG. 5 shows an architectural diagram of a backbone and a branch processing flow for upgrading the FLASH data. The architectural diagram embodies a flow that the main loop body executing module 622, the checking module 623, and the multiple branch processing modules 624 cooperate with each other to implement the FLASH data update, and STATE and SIR in FIG. 5 are both branch processing functions used in the branch processing flow executed by the branch processing modules 624. In this embodiment, the FLASH is characterized in that the data may not be lost when power is off, so that after the chip is powered off abnormally and then powered up again, the latest logic data can be obtained from the FLASH and run, and the system ensures automatic validation of the latest logic data after power-up. Moreover, no reset operation is performed on the chip in this stage; and therefore, if the subsequent upgrade has not been performed on the chip, it is ensured that the original data in the chip can be run normally.

The state detecting module 63 is configured to detect whether the state of a service system that is connected to the chip is a service idle state, and generate a detection result. As shown in FIG. 6, the state detecting module 63 in the present invention may further include at least one of a first state detecting module 631 and a second state detecting module 632. The first state detecting module 631 is configured to regularly query a state parameter of the service system through an upgrade process, to acquire whether the state of the service system is the service idle state; and when the upgrade process queries that the state of the service system is the service idle state, determine that the state which is of the service system connected to the chip and acquired through detection is the service idle state. The second state detecting module 632 is configured to suspend an upgrade process, and monitor in real time the state of the service system through a process that focuses on state monitoring of the service system to acquire whether the state of the service system is the service idle state; and when the process focusing on state monitoring of the service system monitors that the state of the service system is the service idle state, awaken the upgrade process, and determine that the state which is of the service system connected to the chip and acquired through detection is the service idle state.

The locking module 64 is configured to lock the current state of a peripheral input/output interface of the chip. In specific implementation, the locking module 64 is an optional module. Taking a CPLD chip for example, the locking module 64 locks the state of the peripheral input/output interface of the CPLD in the following manner: resetting a JTAG, to make the JTAG module in the CPLD enter an IDLE state, and prepare to accept a subsequent instruction; checking an IDCODE instruction, obtaining data from a TDO port, and checking whether a JTAG logic is normal; sending a sample instruction, that is, sending a sample instruction to the JTAG, obtaining a current state parameter of the peripheral input/output interface of the CPLD, and locking and saving the state parameter; and ending the locking operation. The peripheral input/output pins of the FPGA and the BIOS chip can be locked in a similar way as the CPLD.

The memory update module 65 is configured to, when the state detecting module 63 acquires, through detection, that the state of the service system that is connected to the chip is the service idle state, replicate the upgraded data in the flash memory to a random access memory in the chip, and perform a reset operation on the chip. Further, still referring to FIG. 6, the memory update module 65 in the present invention may specifically include a resetting module 651, an enabling module 652, an erasing module 653, and a replicating module 654. The resetting module 651 is configured to reset the peripheral input/output interface of the chip, to make the input/output interface enter an idle state. For example, when the chip is the CPLD, the resetting module 651 is configured to reset the JTAG module of the CPLD chip, to make the JTAG module in the CPLD enter the IDLE state, and prepare to accept an instruction. The enabling module 652 is configured to enable the random access memory in the chip, to make the random access memory enter an erasable and programmable state. For example, in addition to the FLASH, the CPLD chip further includes a random access memory in the form of an SRAM or a DRAM. When the chip is the CPLD, the enabling module 652 is configured to send an SRAM enable instruction, to enable the SRAME in the CPLD to enter an erasable and programmable state, and create a running condition for a subsequent instruction. The erasing module 653 is configured to erase existing configuration information in the random access memory. The replicating module 654 is configured to replicate the upgraded data in the flash memory to the random access memory. For example, when the chip is the CPLD, the replicating module 654 sends a DISENABLE instruction to the CPLD, to complete an operation of the previously sent instruction, and implement a load action of a new logic from the FLASH to the SRAM; and sends a BYPASS instruction, to make the JTAG module of the CPLD in a bypass state, and disconnect with one or more other modules, that is, the new logic of the CPLD works normally.

In the foregoing embodiment, the baseboard management controller divides the upgrade of the chip that is managed by the baseboard management controller into multiple separate stages, which include a stage of upgrading the flash memory of the chip. In this stage, due to the non-volatility of the flash memory, even if the service system powers down in the subsequent upgrade procedure, the system performance may not be affected, and no reset operation is performed on the chip in this stage; and therefore, when an subsequent upgrade has not been performed on the chip, it is ensured that the original data in the chip can be run normally. In addition, when the state of the service system automatically changes into the service idle state, the baseboard management controller replicates the upgraded data in the flash memory to the random access memory in the chip, so as to complete a full upgrade of the chip. The advantage of this manner is that, mandatorily requiring the service system to shut down and power down during the whole upgrade process is changed into passively waiting for the service system to actively stop a service, so that the system downtime is greatly reduced and the reliability and maintainability of the system are improved. In addition, before replicating the upgraded data in the flash memory to the random access memory in the chip, the baseboard management controller locks the current state of the peripheral input/output interface of the chip, so that in the subsequent procedure of upgrading the chip, a fault operation of the service system may not be caused due to uncontrollability of the peripheral input/output interface.

What is claimed is:

1. A method for upgrading a firmware of a chip, comprising:
    obtaining an upgrade file for upgrading the chip;
    performing cyclic redundancy check on the obtained upgrade file, to obtain a check result;
    when the obtained check result is that the upgrade file is damaged, notifying upper software that the upgrade fails; and
    when the obtained check result is that the upgrade file is not damaged, upgrading, based on the upgrade file, data in a flash memory storing data of the chip, and not performing a reset operation on the chip at this time; and
    when it is acquired, through detection, that a state of a service system that is connected to the chip is a service idle state, replicating the upgraded data in the flash memory to a random access memory in the chip, and performing the reset operation on the chip;

wherein the detection comprises: regularly querying a state parameter of the service system through an upgrade process, to acquire whether the state of the service system is the service idle state; and when the upgrade process queries that the state of the service system is the service idle state, determining that the state which is of the service system connected to the chip and acquired through detection is the service idle state.

2. The method according to claim 1, wherein before the replicating the upgraded data in the flash memory to the random access memory in the chip after it is acquired, through detection, that the state of the service system is the service idle state, the method further comprises:

locking a current state of a peripheral input/output interface of the chip.

3. The method according to claim 1 wherein the flash memory is built in or disposed externally to the chip, the upgrade file is a VME upgrade file, and the upgrading, based on the upgrade file, the data in the flash memory storing the data of the chip and not performing the reset operation on the chip at this time comprises:

obtaining a complete VME upgrade file, and removing an operation instruction of resetting the chip in the file;

executing a main loop body of the VME upgrade file, and obtaining content of the VME upgrade file sequentially by byte;

for byte data which is valid after a check, entering a corresponding branch processing flow, and reading, by the branch processing flow, the byte data in a manner supported by the branch processing flow; and after the branch processing flow is completed, returning to the main loop body to continue obtaining the byte data, and sending the byte data to a branch processing flow that corresponds to newly obtained byte data, till the VME upgrade file is obtained sequentially and completely, and read by each branch processing flow completely.

4. The method according to claim 3, wherein the replicating the upgraded data in the flash memory to the random access memory in the chip, and performing the reset operation on the chip specifically comprises:

resetting a Joint Test Action Group module of the chip, to make the Joint Test Action Group module enter an idle state;

enabling the random access memory in the chip, to make the random access memory enter an erasable and programmable state;

erasing existing configuration information in the random access memory;

making the random access memory enter the erasable and programmable state replicating the upgraded data in the flash memory to the random access memory; and resetting the Joint Test Action Group module of the chip, to make the Joint Test Action Group module enter the idle state.

5. The method according to claim 1, wherein the chip is any one of a complex programmable logic device (CPLD), a field-programmable gate array (FPGA) and a basic input output system (BIOS).

6. A baseboard management controller, comprising:

an obtaining module, configured to obtain an upgrade file upgrading a chip managed by the baseboard management controller; and wherein the obtaining module is further configured to perform cyclic redundancy check on the obtained upgrade file, to obtain a check result; when the obtained check result is that the upgrade file is not damaged, send the obtained upgrade file to a flash memory update module; and when the obtained check result is that the upgrade file is damaged, notify upper software that the upgrade fails;

the flash memory update module, configured to, when the obtained check result is that the upgrade file is not damaged, upgrade, based on the upgrade file obtained by the obtaining module, data in a flash memory storing data of the chip, and prohibit performing a reset operation on the chip;

a state detecting module, configured to detect whether a state of a service system that is connected to the chip is a service idle state, and generate a detection result; and a memory update module, configured to, when the state detecting module acquires and the obtained check result is that the upgrade file is not damaged, through detection, that the state of the service system that is connected to the chip is the service idle state, replicate the upgraded data in the flash memory to a random access memory in the chip, and perform the reset operation on the chip;

wherein the state detecting module comprises a first state detecting module, and the first state detecting module is configured to regularly query a state parameter of the service system through an upgrade process, to acquire whether the state of the service system is the service idle state; and when the upgrade process queries that the state of the service system is the service idle state, determine that the state which is of the service system connected to the chip and acquired through the detection is the service idle state.

7. The baseboard management controller according to claim 6, further comprising:

a locking module, configured to lock a current state of a peripheral input/output interface of the chip.

8. The baseboard management controller according to claim 6, wherein the flash memory is built in or disposed externally to the chip, the upgrade file is a VME upgrade file, and the flash memory update module specifically comprises:

a reset removal module, configured to obtain a complete VME upgrade file, and remove an operation instruction of resetting the chip in the file;

a main loop body executing module, configured to execute a main loop body of the VME upgrade file, and obtain content of the VME upgrade file sequentially by byte, till the VME upgrade file is sequentially and completely obtained by the main loop body executing module;

a checking module, configured to check the validity of the content of the VME upgrade file that is obtained by the main loop body executing module, and obtain a check result; and multiple branch processing modules, configured to read, in a manner supported by the branch processing modules, byte data which is sent to the branch processing modules and is valid after a check that is performed by the checking module, and notify the main loop body executing module after the reading operation is completed.

9. The baseboard management controller according to claim 8, wherein the memory update module comprises:

a resetting module, configured to reset a Joint Test Action Group module of the chip, to make the Joint Test Action Group module enter an idle state;

an enabling module, configured to enable the random access memory in the chip, to make the random access memory enter an erasable and programmable state;

an erasing module, configured to erase existing configuration information in the random access memory; and
a replicating module, configured to replicate the upgraded data in the flash memory to the random access memory.

10. The baseboard management controller according to claim 6, wherein the chip managed by the baseboard management controller is any one of a complex programmable logic device (CPLD), a field-programmable gate array (FPGA) and a basic input output system (BIOS).

11. A chip firmware upgrade system, comprising:
a chip, comprising a built-in or external flash memory storing data of the chip, a random access memory built in the chip and storing the data of the chip, and a peripheral input/output interface communicating with an external connection equipment of the chip; and
a baseboard management controller, configured to perform upgrade management on the chip, wherein the baseboard management controller comprises: an obtaining module, configured to obtain an upgrade file upgrading a chip managed by the baseboard management controller, wherein the obtaining module is further configured to perform cyclic redundancy check on the obtained upgrade file, to obtain a check result when the obtained check result is that the upgrade file is not damaged, send the obtained upgrade file to a flash memory update module; and when the obtained check result is that the upgrade file is damaged, notify upper software that the upgrade fails;
the flash memory update module, configured to upgrade, when the obtained check result is that the upgrade file is not damaged, based on the upgrade file obtained by the obtaining module, data in a flash memory storing data of the chip, and prohibit performing a reset operation on the chip;
a state detecting module, configured to detect whether a state of a service system that is connected to the chip is a service idle state, and generate a detection result; and
a memory update module, configured to, when the state detecting module acquires, and the obtained check result is that the upgrade file is not damaged, through detection, that the state of the service system that is connected to the chip is the service idle state, replicate the upgraded data in the flash memory to a random access memory in the chip, and perform the reset operation on the chip;
wherein the state detecting module comprises a first state detecting module, and the first state detecting module is configured to regularly query a state parameter of the service system through an upgrade process, to acquire whether the state of the service system is the service idle state; and
when the upgrade process queries that the state of the service system is the service idle state, determine that the state which is of the service system connected to the chip and acquired through the detection is the service idle state.

12. The system according to claim 11, wherein the chip is any one of a complex programmable logic device (CPLD), a field-programmable gate array (FPGA) and a basic input output system (BIOS).

* * * * *